United States Patent [19]

Hoggins et al.

[11] 4,359,438

[45] Nov. 16, 1982

[54] PROCESS FOR MOLDING CORROSION RESISTANT FUEL CELL COLLECTING PLATES

[75] Inventors: James T. Hoggins, Columbus; Golden F. Watts, Delaware, both of Ohio

[73] Assignee: Ashland Oil, Inc., Ashland, Ky.

[21] Appl. No.: 303,760

[22] Filed: Sep. 21, 1981

[51] Int. Cl.³ ............................................. B29D 7/00
[52] U.S. Cl. .................................. 264/105; 264/236; 264/331.22; 429/42; 528/159
[58] Field of Search ................... 264/105, 331.22, 236; 429/42; 528/159

[56] References Cited

U.S. PATENT DOCUMENTS

| | | | |
|---|---|---|---|
| 2,860,961 | 11/1958 | Gregor | 264/331.22 |
| 3,228,899 | 1/1966 | Elmer et al. | 528/159 |
| 3,634,569 | 11/1972 | Emanuelson et al. | 264/105 |
| 3,770,544 | 11/1973 | Holt | 528/159 |

OTHER PUBLICATIONS

Zimmerman and Lavine, Handbook of Material Trade Names 1953, Edition, Ind. Research Service, New Hampshire, p. 483.

*Primary Examiner*—James H. Derrington
*Attorney, Agent, or Firm*—Mary E. Picken

[57] ABSTRACT

Durable bipolar fuel cell collecting plates are molded from resin bonded graphite and furfural wetting agent.

7 Claims, No Drawings

PROCESS FOR MOLDING CORROSION RESISTANT FUEL CELL COLLECTING PLATES

The Government has rights in this invention pursuant to Contract Number DAAK70-79-C-0020 awarded by the U.S. Army Mobility Equipment Research and Development Command.

BACKGROUND OF THE INVENTION

In a fuel cell, electricity is produced from chemical fuels. Voltage is generated by portable hydrogen-air fuel cells when hydrogen and compressed air are separately introduced into the cell. A major use of hydrogen-air fuel cells is in remote areas where no other source of electricity is available. Fuel cells are also used in transportation vehicles where hazardous environments dictate the absence of spark plugs and the typical internal combustion engine.

Fuel cells are used to provide either direct or alternating current to small vehicles, to field equipment and for navigation lights. These fuel cells are manufactured in different sizes: small units portable by one person as well as very large units capable of serving as commercial power plants. The small units commonly have useful lives on the order of 5000 hours; those constructed to serve as commercial power plants are designed to last for periods as long as ten to twenty years.

One type of hydrogen-air fuel cell operates at temperatures of about 200° C. and utilizes concentrated phosphoric acid as the electrolyte. The various structural components of this type of fuel cell must withstand this harsh hot acid environment for months or years.

The hydrogen-air fuel cell is made using conventional parts: current collecting plates, electrodes, a matrix membrane separator and an electrolyte. The matrix membrane separates the gas flows to the cathode and to the anode. Mixing of the gases is prevented and is essential to long term use of the fuel cell. The current collecting plates are bipolar plates used to connect adjacent cells in a stack of numerous cells. These bipolar plates distribute the incoming gases around the electrodes and provide rigidity. The plates are made of graphite powders bonded together by an organic polymer resin. The graphite provides the requisite conductivity.

All of the parts of the fuel cell must withstand the 200° C. operating temperature and the phosphoric acid electrolyte. Long term mechanical integrity of the matrix membrane and bipolar collecting plates is essential to prevent mixing of the air and hydrogen. In the past, bipolar plates prepared using conventional techniques could not meet the essential requirements of electrical conductivity, hydrogen impermeability and long term mechanical strength.

SUMMARY OF THE INVENTION

Durable bipolar fuel cell collecting plates are molded from resin bonded graphite and a furfural wetting agent. The plate molding process requires interrupting the heat and pressure molding step to allow the escape of gaseous products. The steps are: blending a phenol formaldehyde resin, hexamethylene tetramine, graphite filler and the furfural wetting agent; charging the blend into a heated mold; heating the charged mold under pressure; releasing the pressure so that gaseous products escape, further heating the charged mold under pressure; removing the plate; and postcuring the plate.

The preferred method requires a first heating step to 100° C., a second heating step to 185° C. and 3200 psi and a postcuring step of heating for 20 hours in a vacuum oven at 220° C.

When a phenol formaldehyde resin is used as a binder the blending step comprises blending 25 parts of a phenol formaldehyde resin having a mole ratio of 1.0 mole phenol to 0.60 to 0.90 mole formaldehyde, a curing amount of hexamethylene tetramine, 75 parts of graphite filler and an effective amount of furfural wetting agent in 100 grams of resin graphite blend. Effective amounts of furfural wetting agent are from 1.0 to 2.0 grams furfural in 100 grams of resin graphite blend. The preferred amount of furfural has been found to be 1.5 grams in 100 grams of resin graphite blend. The preferred formulation using the phenol formaldehyde resin has a mole ratio of phenol:formaldehyde of 1.0:0.77–0.81.

When a styrenated phenol formaldehyde resin is used as a binder the blending step comprises blending 25 parts of a styrenated phenol formaldehyde resin having a mole ratio of 4 moles phenol to 0.1 to 4.0 moles styrene to 3.2 moles formaldehyde, a curing amount of hexamethylene tetramine, 75 parts of graphite filler and an effective amount of furfural wetting agent in 100 grams of resin graphite blend. Effective amounts of furfural wetting agent are from 1.0 to 2.0 grams furfural in 100 grams of resin graphite blend. The preferred amount of furfural has been found to be 1.5 grams in 100 grams of resin graphite blend. The preferred formulation using the styrenated phenol formaldehyde resin has a mole ratio of phenol:styrene:formaldehyde of 4.0:0.9:3.2.

Bipolar fuel cell collecting plates made according to the process of this invention are durable in use in fuel cells. Plates made as controls and not containing the furfural wetting agent are not as durable in the harsh fuel cell operating environment.

The resins useful in this invention are phenol-formaldehyde or alkylated phenol-formaldehyde resins obtained by the use of acid catalysts. For the purposes of this invention the resins which have a low free phenol content, of the order of only 1% are preferred. The resins must also have specific flow characteristics; the resin must be able to flow into crevices and unpacked pockets during molding to seal the plate against acid migration. The measure of the flow characteristics is known as inclined plate flow, further described below.

The acid catalysts used in commercial resin preparations are commonly sulfuric acid or an organic acid such as oxalic acid. The sulfuric acid catalyzed resins usually contain from 5% to 7% free phenol, while oxalic acid catalyzed resins may contain from 2.5% to 5.0% free phenol. Oxalic acid catalyzed resins are preferred since the oxalic acid is mostly decomposed during dehydration and electrically conducting salts are not formed. Neither of the acid catalyzed commercial resins meets the acid resistance requirements of the fuel cell environment when the resins are used to bind graphite fillers in making bipolar collecting plates.

In addition to having low free phenol the resins useful in the claimed invention must, when mixed with a hexamethylene tetramine crosslinker, flow at least 30 millimeters when placed on a 65° plane in a 125° C. oven for 20 minutes. Only those acid catalyzed phenol formaldehyde resins having such inclined plate flow values and less than 1% free phenol are preferred in binding the graphite fillers to form the acid-resistant plates of the present invention.

These necessary resin characteristics are achieved by either of two different approaches. The first of these requires partial alkylation of the phenol component of the phenol-formaldehyde resin. The same necessary characteristics can also be achieved by using a non-alkylated phenol in a resin formulation in which the remnants of unreacted phenol are removed by steam stripping in the ultimate resin preparation step. In this formulation in which steam stripping is used the resin is prepared from non-substituted phenol and formaldehyde. The useful mole ratio of phenol to formaldehyde is in the range of 1.0 mole phenol to from 0.60 to 0.90 mole formaldehyde. The most useful mole ratio was found to be 1.0 mole phenol to 0.77–0.81 mole formaldehyde in a formulation using the oxalic acid catalyst and a steam distillation step to remove free phenol.

The other approach to resin formulation which achieves the required bipolar plate strength is one in which the phenol component is partially alkylated. The alkylation of phenol is accomplished by chemical reaction or by blending pre-reacted alkylated phenol with phenol. In a chemical reaction the phenol is alkylated by using the same or different acid catalyst as used for the reaction of phenol with formaldehyde. Or, alkylated phenols of commercial types can be blended with phenol itself, as long as the final resin meets the two criteria of flow and low free phenol. In general, alkylating or using alkylated phenols of the aliphatic types, as for example n-dodecyl phenol, do not provide the oxidative stabilities needed in fuel cell applications. For the most part, aromatic substitutions furnish much better oxidative stabilities. Thus bis-phenol A resins would be most chemical resistant. However, bis-phenol A itself has a higher crosslinking capability than phenol (4.3). Thus the use of some portion of bis-phenol A, which is possible in this invention, necessitates a higher use of other alkylated phenol in order to provide the required flow or a formaldehyde level sufficiently low as to necessitate severe and inefficient steam distillation. Thus paraphenyl phenol and styrenated phenol appear to be the most desirable. Since styrenated phenol is less costly to prepare than paraphenyl phenol, styrenated phenol was chosen as the alkylated phenol to evaluate in the claimed invention where steam distillation is not used to obtain the requisite low free phenol. It was found that useful ratios of phenol to styrene ranged from 4 moles phenol to from 0.1 to 4 moles styrene. The most useful substituted phenol resin was found to be the styrenated phenol resin prepared in the ratio of phenol:styrene:formaldehyde of 4.0:0.9:3.2.

The wetting agent found to be useful in the preparation of fuel cell bipolar plates is furfural. Useful amounts of furfural range from 1.0 grams to 2.0 grams furfural per 100 grams of graphite resin blend. The most useful amount of furfural was found to 1.5 grams furfural per 100 grams graphite resin blend.

DETAILED DESCRIPTION OF THE INVENTION

Fuel cell composite bipolar collecting plates are prepared by molding graphite powder with a phenolic resin having very little free unreacted phenol that has been pre-ground with hexamethylene tetramine. Curing amounts of hexamethylene tetramine are used in the quantity of 6.0 grams hexamethylene tetramine for 100 grams resin. Twenty-five grams resin require 1.5 grams hexamethylene tetramine as a curing amount. Furfural, a non-phenolic reactive wetting agent, is added to the graphite and admixed. The ground phenolic resin containing hexamethylene tetramine is then added with mixing to the furfural-graphite mixture until a uniform distribution of resin coated graphite is achieved. This mixture is then placed in molds which have been preheated to 65° C. The heated mixture is pressed to twice the final plate thickness while heating is continued to 100° C. When this temperature is reached the pressure is released and the ram is removed to allow gases to escape. The ram is then replaced and the mold is further heated to 185° C. At this final temperature the plate is pressed to its final thickness using 3200 psi, holding at 185° C. and 3200 psi for 20 minutes. After removal from the mold the composite is postcured in a 220° C. vacuum oven for 20 hours.

The following examples further illustrate this invention.

EXAMPLE 1

The phenolic resins used to mold the bipolar plates were prepared as follows:

Resin A, a styrenated phenol formaldehyde resin having a mole ratio of phenol:styrene:formaldehyde of 7.29:1.68:5.77 was made by charging to a reflux system 700 grams phenol and 2.17 grams 98% sulfuric acid. Styrene in the amount of 175 grams was then added gradually, the exotherm reaching 100° C. After styrenating was complete, the mixture was cooled to 95° C. and formaldehyde (assayed at 46.8%) was added in the amount of 370 grams over a 30 minute interval, the exotherm reaching 126° C. The reaction was continued under reflux conditions until the free formaldehyde was less than 0.1%. Sodium hydroxide was added in the amount of 2.1 grams (50% solution), attaining a pH of 7. Dehydration at atmospheric pressure was then started, continuing for one and one-half hours. Vacuum dehydration was then done to a final temperature of 159° C. The resin product had a 228.8 second melt time and melted at 75° C. After adding 10% hexamethylene tetramine the 125° C. flow was 45 mm and there was a 144 second cure at 150° C.

Resin B, a phenol-formaldehyde resin has a mole ratio of phenol:formaldehyde of 1.0:0.77 and was prepared in the following manner. Phenol in the amount of 700 grams was charged to a reflux system and 30 ml water containing 7.0 grams oxalic acid was added. The mixture was kept at 55° C.; formaldehyde assayed at 46.8%, in the amount of 367.5 grams was added over a period of nine minutes; no exotherm occurred. The flask was then heated to 85° C. where the exotherm carried the contents to a boiling reflux. After 3 hours reflux at 100° C., dehydration was started and continued for 30 minutes, a final temperature of 145° C. was reached.

The resin was dehydrated at 27 inches vacuum for 10 minutes and the product was collected. This resin product had a 142 second melt time at 73° C. After the addition of 8.8% hexamethylene tetramine the 125° C. flow was 42 mm; the 150° C. cure was in 68.3 seconds.

EXAMPLE 2

This example illustrates the use of the resins of Example 1 in the preparation of bipolar collecting plates.

The resin was ground and sized to less than 200 mesh. Hexamethylamine tetramine in the amount of 6.0 grams was added to 100 grams resin.

Graphite filler was prepared by combining 100 grams Asbury graphite 7101, 80 grams Asbury graphite 4015 and 20 grams Asbury 250 micro graphite (Asbury Graphite Mills, Asbury, N.J.) Furfural wetting agent in the amount of 1.5 grams per 100 grams graphite-resin mixture was added. This graphite mixture was placed in a one gallon can having three baffles mounted in the interior for mixing purposes. After three hours of mixing on a ball mill 75 grams of the graphite-furfural mixture was blended in an Osterizer blender with 25 grams of the resin-hexamethylene tetramine mixture for five minutes. After blending, the mixture was returned to the baffle can and mixed on the ball mill for one hour.

A nickel plated steel mold was preheated to 65.5° C. and sprayed with a dry lubricant release agent (MS-122, Miller Stephenson Chemical Co.). The resin-furfural-graphite mixture in the amount of 13 grams was charged into the preheated mold. The charged mold was further heated to 100° C. in a heated Cower hydraulic press, pressing with a ram and using metal spacers to twice the ultimate thickness, this step requiring 13 minutes to complete. The pressure was then released; the ram and spacers were removed to allow gases to escape. The ram was replaced, the mold was further heated to 185° C., pressing to ultimate thickness by applying 3200 psi. The pressure and temperature were maintained for 20 minutes. After cooling and removal from the mold, the bipolar plates were postcured in a Fisher Vacuum oven for 20 hours at 220° C. under vacuum. Test samples in the form of coupons were prepared in the same manner as the plates.

Corrosion tests consisted of soaking the coupons in 85.6% phosphoric acid in a 190° C. oven. The coupons were tested periodically to measure weight loss on exposure to the high temperature acidic conditions of the simulated fuel environment.

Table I presents the weight loss results when coupons were prepared from the resins of Example 1 according to the process of Example 2.

TABLE 1

| Coupon # | Binder | % Furfural Wetting Agent | % Weight Loss After 450 Hours 190° C. Phosphoric Acid |
|---|---|---|---|
| L-9 | Resin A | 0 | 3.08 |
| L-10 | Resin A | 0 | 3.42 |
| M-12 | Resin A | 1.5 | 0.21 |
| M-13 | Resin A | 1.5 | 1.45 |
| M-2 | Resin B | 0 | 2.65 |
| M-5 | Resin B | 0 | 3.35 |
| M-20 | Resin B | 0 | 7.10 |
| M-21 | Resin B | 1.5 | 1.75 |
| M-22 | Resin B | 1.5 | 0.38 |
| M-14 | Resin B | 1.5 | 0.28 |
| M-15 | Resin B | 1.5 | 0.33 |

We claim:

1. A process for making bipolar fuel cell collecting plates comprising the steps of:
   (a) blending 25 parts of a phenol formaldehyde resin having a mole ratio of 1.0 mole phenol to 0.60 to 0.90 mole formaldehyde, a curing amount to reduce weight loss on exposure to high temperature acidic conditions, of hexamethylene tetramine, 75 parts of graphite filler and an effective amount of furfural wetting agent in 100 grams of resin graphite blend;
   (b) charging the blend into a heated mold;
   (c) heating the charged mold under pressure;
   (d) releasing the pressure allowing the escape of gaseous products;
   (e) further heating the charged mold under pressure;
   (f) cooling the mold;
   (g) removing the formed plate; and
   (h) postcuring the formed plate.

2. A process as recited in claim 1 wherein said mole ratio of phenol to formaldehyde is 1.0:0.77–0.81.

3. A process for making bipolar fuel cell collecting plates comprising the steps of:
   (a) blending 25 parts of a styrenated phenol formaldehyde resin having a mole ratio of 4 moles phenol to 0.1 to 4.0 moles styrene to 3.2 moles formaldehyde, a curing amount of hexamethylene tetramine, 75 parts of graphite filler and an effective amount, to reduce weight loss on exposure to high temperature acidic conditions of furfural wetting agent in 100 grams of resin graphite blend;
   (b) charging the blend into a heated mold;
   (c) heating the charged mold under pressure;
   (d) releasing the pressure allowing the escape of gaseous products;
   (e) further heating the charged mold under pressure;
   (f) cooling the mold;
   (g) removing the formed plate; and
   (h) postcuring the formed plate.

4. A process as recited in claim 3 wherein said mole ratio of phenol:styrene:formaldehyde is 4.0:0.9:3.2.

5. A process as recited in claim 2 or 4 wherein said first heating step is to 100° C.

6. A process as recited in claim 2 or 4 wherein said second heating step is to 185° C. and 3200 psi.

7. A process as recited in claim 2 or 4 wherein said postcuring step comprises heating for 20 hours in a vacuum oven at 220° C.

* * * * *